(12) United States Patent
Tsuboi et al.

(10) Patent No.: US 6,500,550 B1
(45) Date of Patent: Dec. 31, 2002

(54) RESIN-COMPOSITE ALUMINUM PROFILES, HEAT INSULATING ALUMINUM PROFILES, AND METHOD AND APPARATUS FOR PRODUCTION THEREOF

(75) Inventors: Masatake Tsuboi, Uozu (JP); Masaki Wakabayashi, Toyama-ken (JP); Norio Shioda, Toyama (JP); Shigeo Irie, Furukawa (JP); Masaaki Iwakura, Kurobe (JP); Toshiyuki Shoji, Furukawa (JP)

(73) Assignee: YKK Corporation (JP)

( * ) Notice: Subject to any disclaimer, the term of this patent is extended or adjusted under 35 U.S.C. 154(b) by 156 days.

(21) Appl. No.: 09/630,707

(22) Filed: Aug. 1, 2000

Related U.S. Application Data

(62) Division of application No. 09/090,948, filed on Jun. 5, 1998, now Pat. No. 6,143,372.

(30) Foreign Application Priority Data

Jun. 11, 1997 (JP) .............................................. 9-167883

(51) Int. Cl.[7] ................................................. B32B 15/08
(52) U.S. Cl. ...................... 428/425.8; 428/457; 428/458; 428/463
(58) Field of Search ............................. 428/425.8, 457, 428/458, 463; 427/466, 533, 536, 458

(56) References Cited

U.S. PATENT DOCUMENTS

| | | | |
|---|---|---|---|
| 4,717,516 A | 1/1988 | Isaka et al. .................... 264/22 |
| 4,743,672 A | 5/1988 | Goel ............................ 528/44 |
| 5,026,463 A | 6/1991 | Dinter et al. ................ 204/164 |
| 5,135,773 A | 8/1992 | Suzuki ......................... 427/13 |
| 5,229,214 A | * 7/1993 | Maze et al. .................. 428/458 |
| 5,280,084 A | 1/1994 | Paul ............................ 525/375 |
| 5,391,436 A | * 2/1995 | Reid ........................ 428/423.1 |
| 5,780,118 A | 7/1998 | Tracy et al. ................. 427/508 |

FOREIGN PATENT DOCUMENTS

GB 2 200 359 A 8/1988

* cited by examiner

Primary Examiner—D. S. Nakarani
(74) Attorney, Agent, or Firm—Finnegan, Henderson, Farabow, Garrett & Dunner LLP

(57) ABSTRACT

A method is disclosed for producing a resin-composite profile. The method comprises providing an aluminum profile having a coating film that is capable of forming a functional group which reacts with isocyanate. A discharge treatment is performed on the film wherein the treated surface is capable of reacting with isocyanate. A urethane resin substantially formed of isocyanates and polyol is joined to the discharge treated surface.

1 Claim, 12 Drawing Sheets

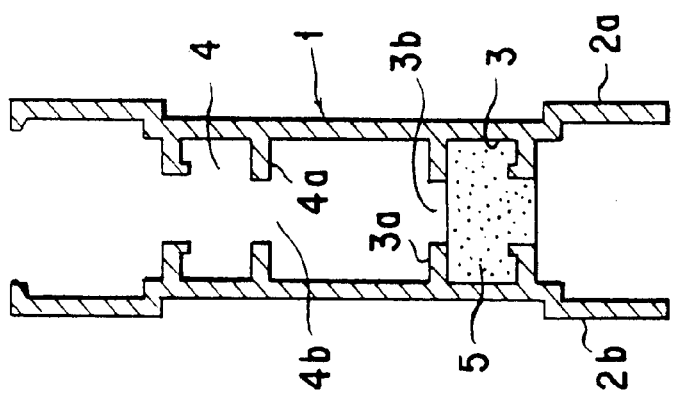
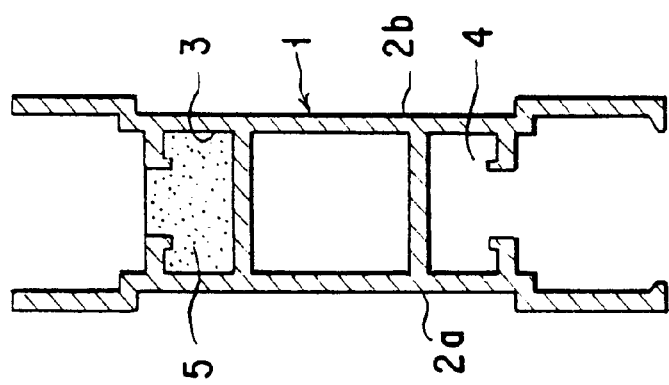
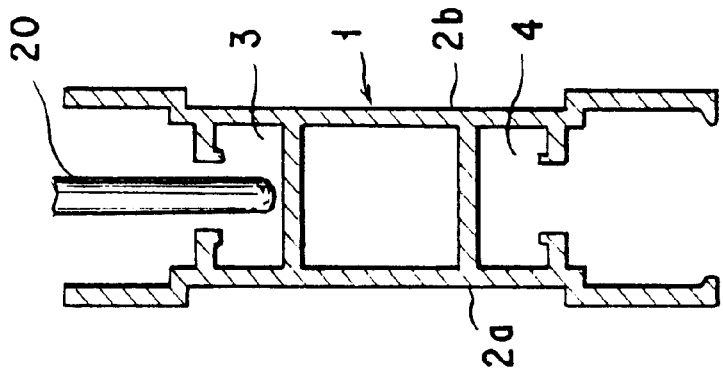

RESIN-COMPOSITE ALUMINUM PROFILES, HEAT INSULATING ALUMINUM PROFILES, AND METHOD AND APPARATUS FOR PRODUCTION THEREOF

This is a division of application Ser. No. 09/090,948, filed Jun. 5, 1998, now U.S. Pat. No. 6,143,372, incorporated herein by reference.

BACKGROUND OF THE INVENTION

1. Field of the Invention

This invention relates to a technique for the union between an aluminum profile and a resin material, and more particularly to resin-composite aluminum profiles having a resin material joined to an aluminum profile, especially heat insulating aluminum profiles having the joined parts of opposed lateral sheet members of an aluminum profile formed with a resin material, a method for the production of the profiles, and an apparatus, particularly a discharge treatment apparatus to be used for the production of the profiles.

The term "aluminum profile[s]" is used herein to express the shapes or sections of aluminum or an aluminum alloy shaped into a continuous form (hereinafter referred to simply as "profile[s]") and the term "resin-composite aluminum profile[s]" is used to express the concept embracing the heat insulating aluminum shapes or sections (hereinafter referred to simply as "heat insulating profile[s]").

2. Description of the Prior Art

The composite profiles having a resin material joined to the surface or recess of a profile have been used in various technical fields because they are light and excellent in durability, strength, or the like. Particularly, in the technical field of construction, sashes which are provided on either of the exterior and the interior side of building with a double paper sliding door disposing part have been disseminating with a view to affording insulation from heat, abating noise, and preventing dew condensation. The heat insulating profiles are used in the frames of such sashes.

The heat insulating profile is provided between the opposed lateral sheet members thereof with a joined part formed of synthetic resin and, in this structure, allowed to have the opposed lateral sheet members integrally joined by the adhesive force of the resin material and, owing to the intervention of the resin material between the opposed sheet members, enabled to manifest the functions of affording insulation from heat, abating noise, and preventing dew condensation. As the resin material mentioned above, generally a foamable hard polyurethane resin is used as taught in published Japanese Patent Application, KOKAI (Early Publication) No. 54-19, 537, for example.

Generally in the production of the heat insulating profile, a urethane resin material is injected to capacity into a recess provided between the coated, opposed lateral sheet members of a profile and wished to be packed with a resin and thereafter the portion of the profile which forms the recess is cut so that the opposed lateral sheet members are joined to each other solely with the urethane resin.

Since the adhesive force produced by the urethane resin is not sufficient, however, the resin and the profile are liable to peel off each other. Once the separation of this sort occurs, the profile has the problem of emitting a squeak when deformed under an external force and betraying deficiency in strength as well. Further, the heat insulating profile entails the problems of durability such as causing shrinkage of the urethane resin after a protracted use, tending to induce the phenomenon of giving rise to a step in the butt end (discernible by a test of repeating cycles of cooling and heating), and possibly inserting a crack in the face of union and inducing leakage of rain water through the crack. For the purpose of compensating the urethane resin for the shortage of adhesive force, such measures as applying a primer layer to the inner surface of the recess in the profile wished to be filled with resin or mechanically forming a multiplicity of claw parts on the inner surface have been heretofore proposed. These measures, however, entail highly expensive treatments, require introduction of expensive devices, and suffer poor productivity. These treatments are not easily performed uniformly on the inner surface of the recess, particularly so when a hole-forming part for a screw is protruded into the recess.

SUMMARY OF THE INVENTION

It is, therefore, an object of the present invention to develop a technique for improving the adhesive force to be generated between a profile and a resin by a relatively simple and inexpensive method and, therefore, allow manufacture of the composite profiles or heat insulating profiles having a profile and a resin joined fast to each other at a low cost with high efficiency.

Particularly, the present invention has for an object thereof the provision of the composite profiles, especially the heat insulating profiles, which allow easy treatment of the recess wished to be filled with resin even when a hole-forming part for screw is protruded into the recess, produce high adhesive strength between a profile and a resin, prevent the profile from emitting a squeak even on exposure to an external force, exhibit high strength, offer strong resistance to the shrinkage of resin, entail virtually no phenomenon of giving rise to a step in the butt end, and excel in durability enough to withstand a protracted use and a highly efficient method for the manufacture thereof.

A further object of the present invention is to develop an apparatus, particularly an electrode for a discharge treatment apparatus, which can be advantageously used for the method described above.

To accomplish the objects described above, the present invention in the basic aspect thereof provides a method for the production of a resin-composite profile characterized by performing a discharge treatment on the surface of the portion of a coated profile destined for union with resin and joining a resin material to the discharge treated portion. When the profile has a recess wished to be packed with resin, the discharge treatment is performed on the inner surface of the recess and the discharge treated recess is filled with the resin material.

The adoption of this method equals the provision of a resin-composite profile which has a resin material joined fast integrally to the discharge treated portion of the coated surface of the profile.

The profile to be effectively used for the present invention may be a profile having a coating film formed by a coating treatment on the surface of a profile of aluminum or an aluminum alloy, generally an extruded profile, or a profile having formed thereon a composite film comprising an anodic oxide film, colored oxide film, or chemical conversion film and a coating film superposed thereon. Thus, a profile furnished on the surface thereof with a coating film is invariably usable for the present invention. The coating treatment involved herein may be performed by any of the heretofore known methods such as, for example, electrodeposition coating, immersion coating, and electrostatic coating.

In accordance with another aspect of the present invention, there is provided a method for the production of a heat insulating profile characterized by performing a discharge treatment on the inner surface of a recess disposed between opposed lateral sheet members of a coated profile and intended to be filled with resin, filling a resin material in the discharge treated recess, and then cutting the portion of the profile forming the recess, thereby obtaining a heat insulating profile having the opposed lateral sheet members integrally joined to each other with the resin material filled as described above. When the profile mentioned above has at least two recesses disposed between the opposed lateral sheet members and destined to be filled with resin, the discharge treatment and the packing of resin material are performed on the interior of one of the recesses and then the portion of the profile forming the other recess is cut when the portion of the profile forming the recess mentioned above is subsequently cut, a resin sheet is superposed on the cut portion of the other recess to occlude this cut portion, and subsequently the discharge treatment and the packing of resin material are performed on the interior of the other recess.

The adoption of this method results in the provision of a heat insulating profile which has the joined part of the opposed lateral sheet members of a coated profile, the joined part (joining member) being formed of a resin material joined fast integrally to the discharge treated portions of the opposed surfaces of the opposed lateral sheet members.

The present invention further provides an apparatus for the production of the composite profile or heat insulating profile mentioned above, characterized by being furnished at least with means for conveying a coated profile, discharge means disposed so as to be freely approximated to the profile on the conveying means for the purpose of performing a discharge treatment on the profile in motion on the conveying means, and resin filling means disposed on the downstream side of the discharge means and adapted to be freely approximated to the profile on the conveying means. The apparatus for the production of a heat insulating profile is furnished on the downstream side of the resin filling means with a device for cutting the resin-filled recess portion of the profile similarly in the standard apparatus for production and, when the profile has at least two recesses, furnished further with a device for sealing the cut recess portion with a resin sheet.

The present invention further provides an electrode for the discharge treatment of a profile, which can be used advantageously for the discharge treatment mentioned above. Preferably the electrode comprises a base part shaped like a rod or a plate and connected to a high-voltage power source and a projecting part adapted to protrude laterally from the lower terminal portion of the base part and confront the inner surface of a recess to be treated when the projecting part is, inserted into the recess of a profile. In a preferred embodiment, the projecting part comprises a plurality of-linear materials having the upper ends thereof bundled and fixed to the lower terminal portion of the base part.

The use of the apparatus of the present invention mentioned above, particularly the use of the aforementioned electrode for the discharge treatment, allows the discharge treatment to be performed effectively and continuously on the part of the surface of a coating film of the profile which is wished to be treated and results in improving the productivity of the composite profile and the heat insulating profile.

BRIEF DESCRIPTION OF THE DRAWINGS

Other objects, features, and advantages of the invention will become apparent from the following description taken together with the drawings, in which:

FIGS. 1A through 1F are schematic explanatory diagrams illustrating a process for producing a heat insulating profile according to the method of the present invention;

FIG. 5 depicting an electrode shaped like a round rod, FIG. 6 an electrode shaped like a plate, FIG. 7 an electrode shaped like a disc; and FIG. 8 and FIG. 9 electrodes of other shapes;

DETAILED DESCRIPTION OF THE INVENTION

Figure 1F:
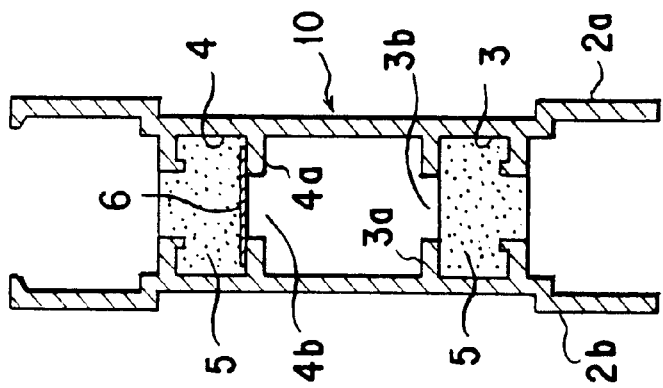

The production of a composite profile or heat insulating profile according to the present invention is basically characterized by increasing the adhesive strength between resin and a profile by performing a discharge treatment in advance on the coated surface of the resin-joining portion of a profile or the coated inner surface of a recess formed in the profile and destined to be packed with resin. When the discharge treatment of this sort is performed, the chemical bonds between the resin molecules forming a coating film on the surface of the profile are severed and free hydrophilic functional groups such as, for example, —OH, —COOH, =NH, —NH$_2$, —SH, —SOH, or —NHCO— are formed, depending on the kind of coating material used, by the discharge energy or liberated electrons, with the result that the resin on the surface of the coating film will acquire improved wettability. It is also conceivable that the ozone generated by electric discharge will activate the surface of the coating film and improve the affinity of the surface for the resin. These actions markedly exalt the adhesive strength between the resin and the profile and, even in the heat insulating profile of a structure such that the opposed lateral sheet members thereof are joined to each other solely with a resin material interposed therebetween, allow integral union with markedly high adhesive strength. The heat insulating profile itself, therefore, acquires enhanced strength, avoids emitting a squeak on exposure to an external force, offers high durability to resist the shrinkage of resin during a protracted use, and entails virtually no possibility of forming a step in the butt end. Particularly, when the resin material to be used for filling is such a resin as a urethane resin which is formed of isocyanate and polyol and therefore possessed of a functional group capable of reacting with the free functional group to be formed on the surface of a coating film in consequence of the discharge treatment mentioned above, the reaction between these functional groups exalts the adhesive strength to a very high extent.

The coating film on the surface of the profile is only required to be capable of forming such a hydrophilic functional group as mentioned above in consequence of the discharge treatment. As concrete examples of the coating film answering this description, the coating films which result from applying acrylic resin coating material, acryl-melamine resin coating material, polyester coating material, polyurethane coating material, melamine resin coating material, acryl-silicone resin coating material (having two or more fluorine atoms bound to a silane group) by such a coating method as electrodeposition coating, immersion coating, or electrostatic coating may be cited.

In contrast, as the resin material to be joined to or filled in a profile, various kinds of heat insulating resin such as, for example, urethane resins or epoxy resins of the cold-setting type, or acrylic resins of the photo-setting type can be used. Among other heat insulating resins mentioned above, the urethane resins which possess suitable flexibility at normal room temperatures or in a range of low temperatures and retain strength and suitable rigidity in a range of high temperatures prove to be particularly advantageous.

As concrete examples of the method for performing the discharge treatment, (1) a method which comprises performing a corona discharge on a given coating film at normal room temperature under normal pressure thereby effecting a surface treatment of the coating film (corona discharge treatment), (2) a method which comprises performing a glow discharge on a given coating film in a vacuum thereby treating the surface of the coating film (ionic treatment), and (3) a method which comprises sealing a given coating film in a vacuum containing a trace quantity of a monomer and an inert gas and performing a glow discharge on the coating film to effect a surface modification of the coating film (plasma treatment) may be cited. These methods are invariably capable of modifying the surface of the coating film of a profile by virtue of electric energy. Among other methods mentioned above, the method of corona discharge treatment which can be carried out rather simply at normal room temperature under normal pressure at a low cost proves to be particularly advantageous. The treating devices available for the corona discharge treatment are broadly known in three types, i.e. a spark gap system, a vacuum tube system, and a solid state system. For the discharge treatment contemplated by the present invention, any of these systems can be effectively adopted.

The conditions for the discharge treatment are preferred to be set such that the surface of the coating film of a discharge treated profile registers a surface tension of not less than 45 dyn/cm or causes 5 μl of water drops poured thereon to spread over an area of not less than 3.5 cm, preferably not less than 3.7 cm in diameter. These conditions can be adjusted, for example, by suitably setting the speed of conveyance of the profile or the magnitude of discharge voltage or other discharge conditions.

Now, the present invention will be described more specifically below with reference to the annexed drawings.

FIGS. 1A through 1F illustrate one example of the process to be performed when the method of the present invention is applied to the production of a heat insulating profile.

First, as illustrated in FIG. 1A, an electrode 20 for discharge treatment is inserted into one (3) of two resin filling recesses 3 and 4 (hereinafter referred to as "pouring pockets") disposed between opposed lateral sheet members 2a and 2b of a coated profile 1 in such a manner as to interconnect the sheet members 2a and 2b and it is operated therein to perform a discharge treatment on the inner surface of the pouring pocket 3. Then, as illustrated in FIG. 1B, a resin 5 is poured into the discharge treated pouring pocket 3 and allowed to set therein. And the profile 1 is turned upside down. By the use of a suitable cutting tool (not shown), part of a bottom portion 4a is cut from the other pouring pocket 4 side as illustrated in FIG. 1C and, at the same time, part of the bottom portion 3a of the other pouring pocket 3 is likewise cut. (Incidentally, when the profile 1 possesses only one pouring pocket 3, the cutting tool may be inserted through an opening on the bottom portion 3a side and manipulated to cut part of the bottom portion 3a.)

Figure 1E:
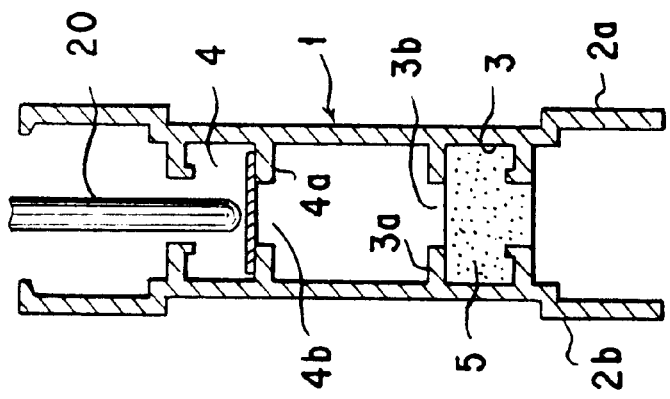
Figure 1D:
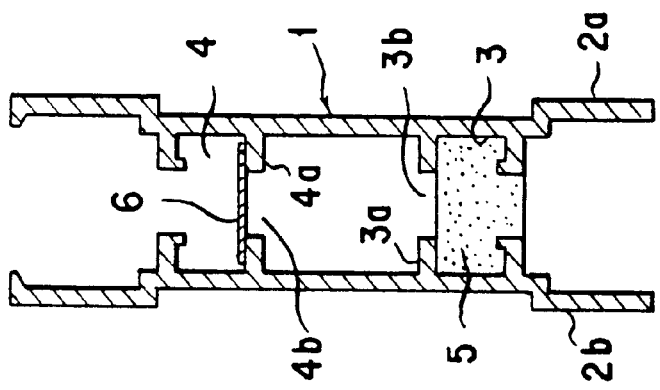

Then, as illustrated in FIG. 1D, a resin sheet 6 is applied fast to the bottom portion 4a of the other pouring pocket 4 so as to cover the cut opening part 4b. Various kinds of synthetic resin sheet may be used as the resin sheet 6. This resin sheet 6 is preferred to be a sheet of polyester which possesses fair rigidity and forms a free hydrophilic functional group like —COOH in consequence of discharge treatment. The thickness of this resin sheet 6 which is proper for the present invention generally falls in the approximate range of 150–180 μm, depending on the kind of the resin sheet to be used. Thereafter, as illustrated in FIG. 1E, the electrode 20 for discharge treatment is inserted into the other pouring pocket 4 and operated to perform a discharge treatment on the surfaces of the pouring pocket 4 and resin sheet 6. Subsequently, by pouring the resin 5 into the pouring pocket 4 which has undergone the discharge treatment as described above and allowing the resin to set therein, a heat insulating profile 10 having the opposed lateral sheet members 2a, 2b joined fast integrally to each other with a pair of joined parts formed of the resin 5.

Alternatively, the process of discharge treatment may be performed first on the upper and lower pouring pockets 3 and 4 (by performing the discharge treatment on the pouring pocket 3 as illustrated in FIG. 1A, then turning the profile 1 upside down, and subsequently performing the discharge treatment on the pouring pocket 4, for example) and thereafter the steps of FIGS. 1B, 1C, 1D, and 1F may be carried out.

In the case of a profile having three pouring pockets, it is manufactured in a structure such that an opening part is formed in advance in the bottom portion of one of the opposite pouring pockets. On this pouring pocket, therefore, the discharge treatment and the filling of resin can be performed in accordance with the process of FIGS. 1D through 1F mentioned above.

Figure 2:
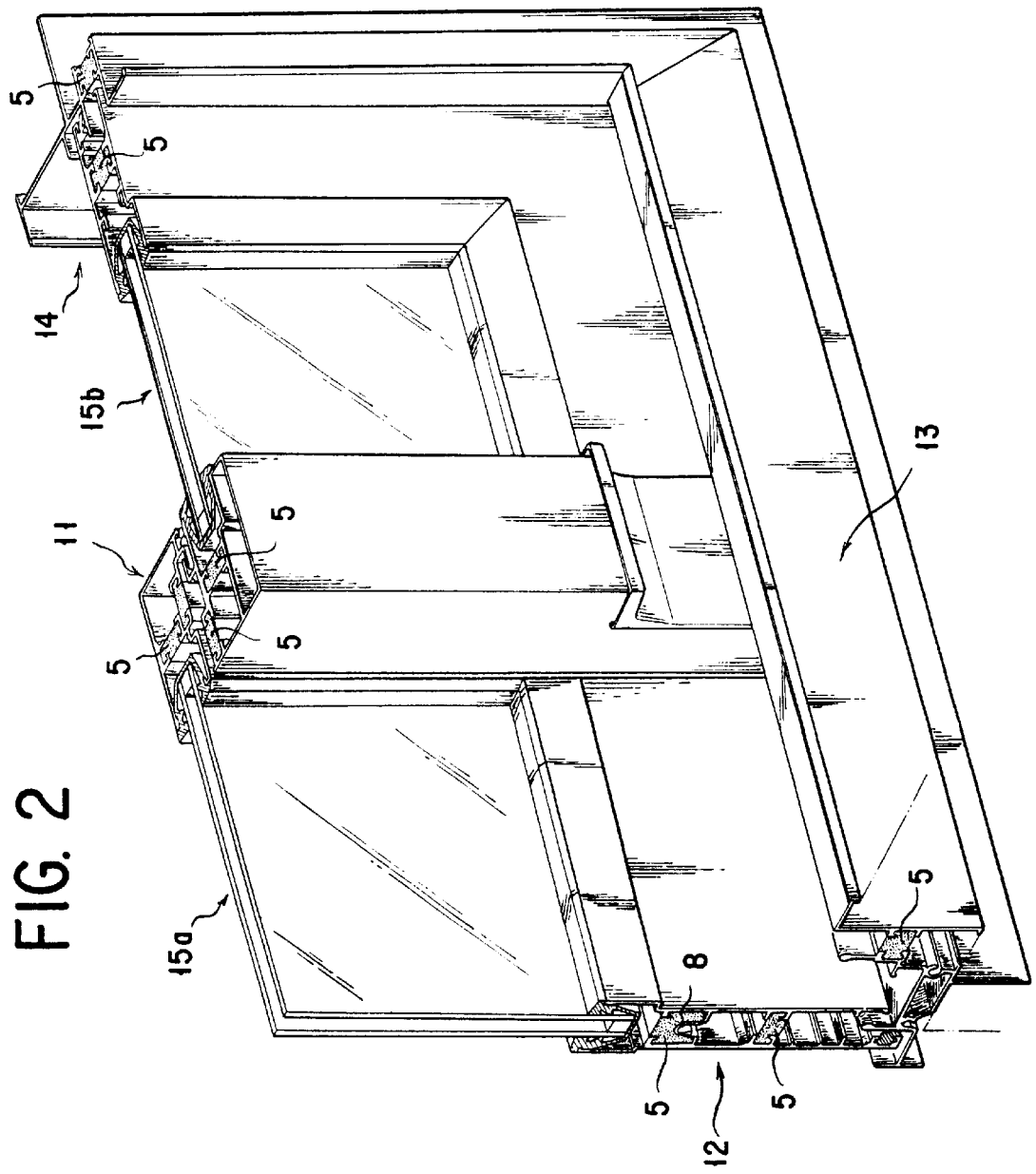
FIG. 2 is a fragmentary perspective view illustrating one example of an aluminum sash formed by assembling heat insulating profiles of various structures.

FIG. 2 illustrates part of one example of an aluminum sash formed by assembling heat insulating profiles of various structures produced by the method described above. In the diagram, the reference numeral 11 represents an outer meeting stile, 12 a lower rail, 13 a lower frame, and 14 a vertical frame, which are invariably heat insulating structures using the resin 5. The reference numerals 15a and 15b each represent a double-wall glass. Owing to the structure of this sort, the produced aluminum sash excels in the ability to offer insulation from heat, the ability to prevent dew condensation, and the durability. Further, since the component heat insulating profiles excel in adhesive strength with the resin, the aluminum sash will not emit a squeak even when it is accidentally exposed to an external force.

Figure 3:
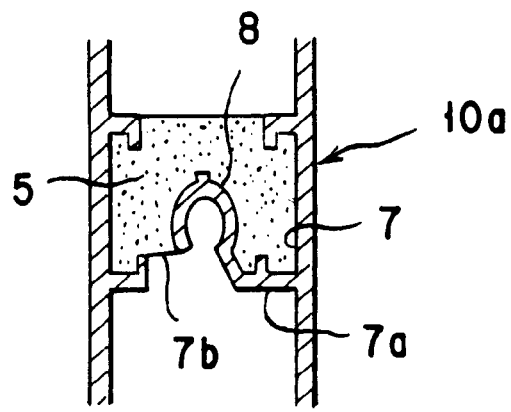
FIG. 3 is a fragmentary cross section of a heat insulating profile having a hole-forming part for a screw.

FIG. 3 is a fragmentary cross section illustrating one example of a heat insulating profile 10a having a hole-forming part 8 for screw protruded into a pouring pocket 7 similarly in the lower rail 12 illustrated in FIG. 2. According to the method of the present invention, the discharge treatment and the filling of resin can be easily performed even on the pouring pocket 7 which is furnished with the hole-forming part 8 for screw.

Incidentally, a cut part 7b of a bottom portion 7a of the pouring pocket 7 in this structure is generally held to be one of the basal parts of the hole-forming part 8 for screw.

Figure 4:
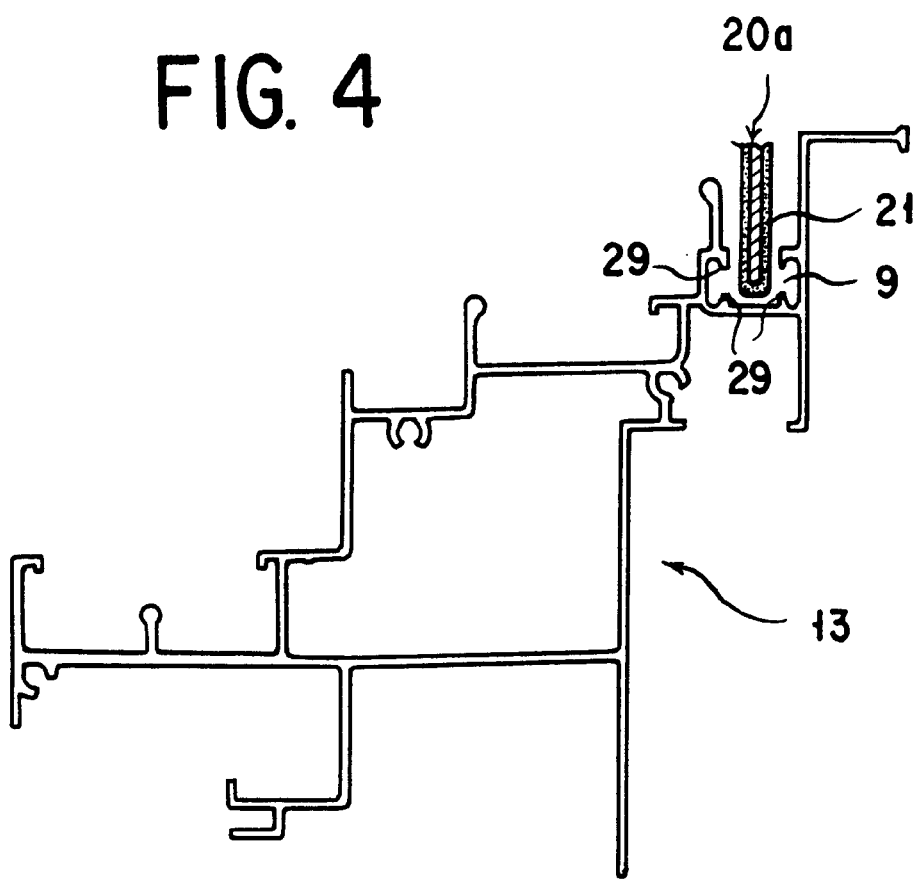
FIG. 4 is a cross-sectional view illustrating the state in which an electrode for discharge treatment is inserted into a pouring pocket in the lower frame.

FIG. 4 illustrates one example of the insertion of a discharge treatment electrode 20a into a pouring pocket 9 of the lower frame 13 illustrated in FIG. 2. The discharge treatment electrode 20a is depicted herein as being lined with a silicone rubber 21.

The electrode to be used in the discharge treatment can be made in various shapes as illustrated in FIG. 5 through FIG. 9.

Figure 5:
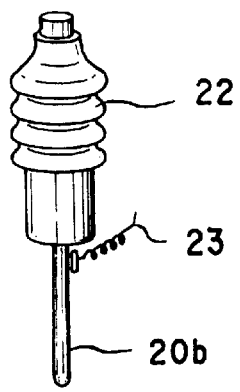
FIGS. 5 through 9 are perspective views illustrating various kinds of electrode.
Figure 6:
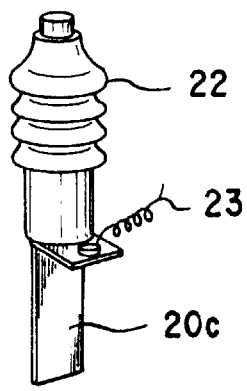
Figure 7:
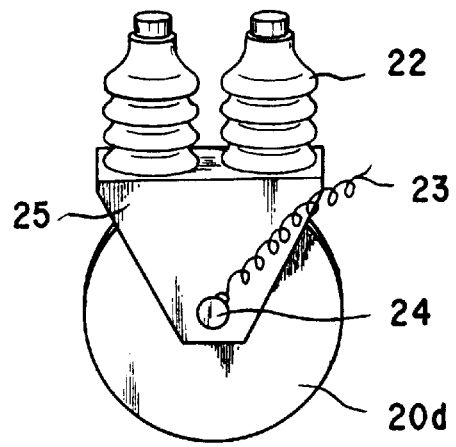

FIG. 5 illustrates an electrode 20b shaped like a round rod and FIG. 6 illustrates an electrode 20c shaped like a plate. These electrodes each have a high-voltage lead wire 23 set in place with a screw in the upper part thereof. The reference numeral 22 represents a porcelain insulator. FIG. 7 illustrates an electrode 20d shaped like a disc. The electrode 20d is rotatably attached to a bracket 25 through the medium of a pin 24 having the high-voltage lead wire 23 connected thereto.

Figure 8:
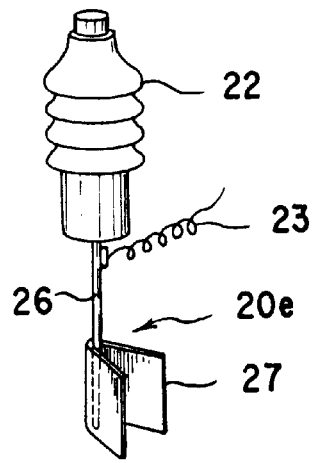

An electrode 20e illustrated in FIG. 8 has a structure such that a projecting part 27 whose cross section laterally diverges in the shape of the letter V is fixed to the lower terminal portion of a rodlike base part 26 having the high-voltage lead wire 23 connected thereto. The provision of this projecting part 27 brings about such advantages as imparting elasticity to the relevant portion, facilitating the insertion of the electrode into the pouring pocket of the profile in motion on the conveying means, allaying the concentration of discharge on the claws (represented by the reference numeral 29 in FIG. 4, for example) protruding into the pouring pocket, and ensuring easy discharge throughout the entire inner surface of the pouring pocket.

As the material for the electrode, aluminum, stainless steel, iron, or copper may be used either in a form devoid of a coating or in a form lined with such a dielectric as silicone rubber as illustrated in FIG. 4.

Figure 9:
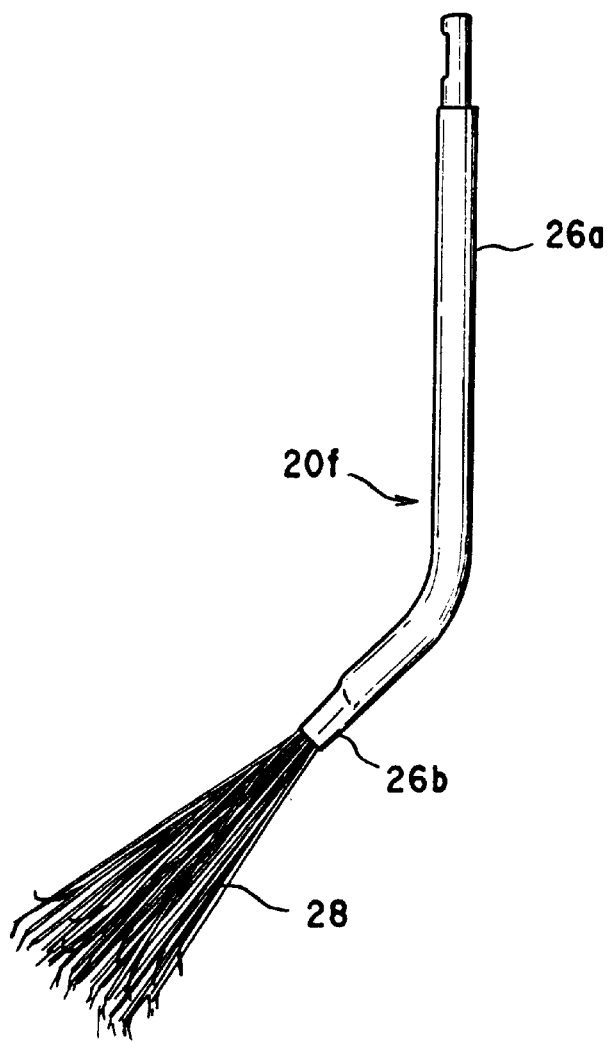

FIG. 9 illustrates the structure of an electrode which can be used most advantageously for the method of the present invention. This electrode 20f comprises a solid base part 26a shaped like a round rod, a hollow part 26b formed in the lower terminal portion of the base part 26a, and a multiplicity of wires 28 whose upper ends are bundled, inserted in the hollow part 26b, and fixed therein by caulking. Though the lower part of the base part 26a is bent so as to be easily inserted into the pouring pocket of the profile in motion on the conveying means, it may be in a straight shape. Generally, a standard electrode tends to discharge electricity through the leading end (edge part) thereof during the course of discharge. The present electrode, owing to the incorporation of the bundle of a multiplicity of wires 28 for the sake of discharge, is effective in enlarging the area of discharge, preventing the concentration of discharge on the claws protruding into the pouring pocket, enabling the discharge to occur throughout the entire inner surface (bottom surface and lateral surfaces) of the pouring pocket, and ensuring improvement of the surface modification of the coating film forming the inner surface of the pouring pocket. The unit diameter of the wires 28, the quantity thereof, and the positions of their leading terminals can be suitably adjusted in accordance with the cross-sectional shape, size, etc. of the recess (pouring pocket) subjected to the discharge treatment. In the case of the standard heat insulating profile, it is desirable that the unit diameter of the wires be not more than 1 mm, preferably in the range of 0.1–0.7 mm, and the quantity thereof be not more than 100. Optionally, the component wire may be formed by intertwining still thinner wires. In this case, since the leading terminal parts of the wires come apart and expose the leading terminal parts of a greater number of thinner wires, they allow easy discharge of electricity. Since the component wires are further endowed with elasticity, they are at an advantage in resuming their original shape perfectly after the discharge treatment which is performed while they are sliding in a bent form on the inner surface of the pouring pocket.

Figure 10:
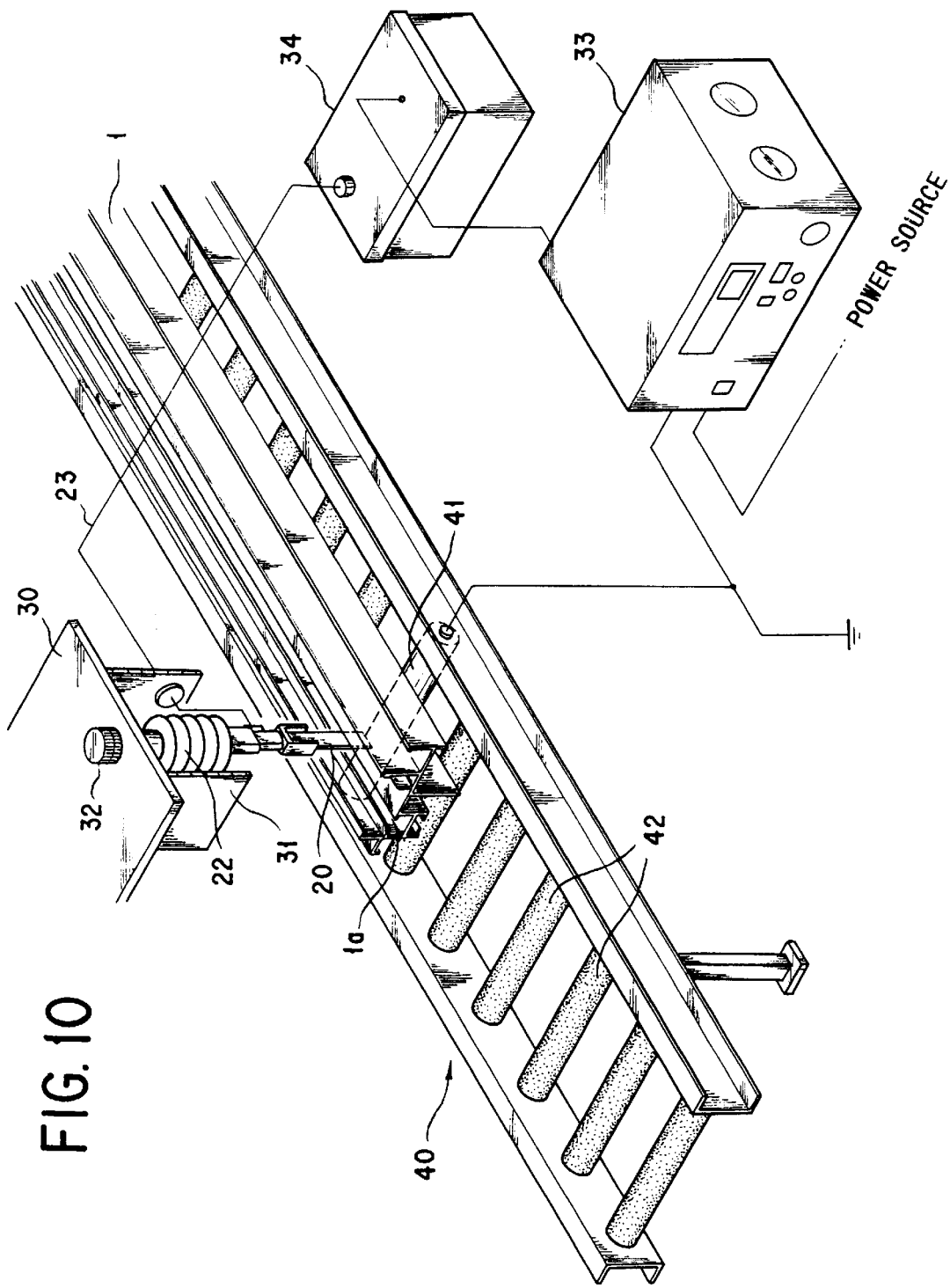
FIG. 10 is a fragmentary perspective view illustrating one example of a device for corona discharge treatment.

FIG. 10 schematically illustrates the state in which a corona discharge treatment is performed on the profile 1 which is in motion on a conveying device 40 of the conveyor roller type.

The electrode 20 is fitted to an elevating plate 30 through the medium of the porcelain insulator 22 and the periphery of the electrode 20 is enclosed with an electrode cover 31 made of synthetic resin and fitted to the elevating plate 30. The reference numeral 32 represents an electrode gap adjuster for adjusting the distance between the leading terminal of the electrode 20 and the profile 1. The conveying device 40 is provided in the part thereof falling directly below the electrode 20 with a metallic drive roller 41, which is connected to the grounding side of a high-frequency oscillator 33. The electrode 20 is connected to a high-voltage transformer 34 through the medium of the high-voltage lead wire 23. When the corona discharge is generated by the application of a high voltage between the electrode 20 inserted in the pouring pocket 1a of the profile 1 and the profile 1 held in contact with the metallic drive roller 41, therefore, the corona discharge treatment is continuously performed on the inner surface of the pouring pocket 1a of the profile 1 which is in motion on the conveying device 40. The other drive rollers 42 used in the conveying device 40 are rollers lined with rubber. Though the speed of conveyance of the profile is suitably adjusted, it is preferred to be in the approximate range of 5–60 m/min. The high-frequency power source for the corona discharge has a frequency generally in the range of 8,000–35,000 Hz, preferably below 10,000 Hz, and a voltage of not less than 0.5 kV, preferably not less than 3 kV.

Incidentally, the corona discharge treatment is effected at a high frequency and a high voltage. The high-voltage part, when approached by a human body, has the possibility of emitting a spark and burning the skin of the human body. For preventing this accident, the electrode 20 and the metallic drive roller 41 are encircled with a protective frame, which is omitted from illustration here by reason of a limited space. When the corona discharge is effected in the air, it emits $O_3$ and $NO_x$, which have adverse effects on the health of the operator. The room in which the treatment is performed, therefore, must be furnished with a duct extended to the exterior of the room so that the air therein may remain clean at all times. Alternatively, the protective frame mentioned above may be substituted by a protective box which is adapted to ventilate the room interior.

Figure 11:
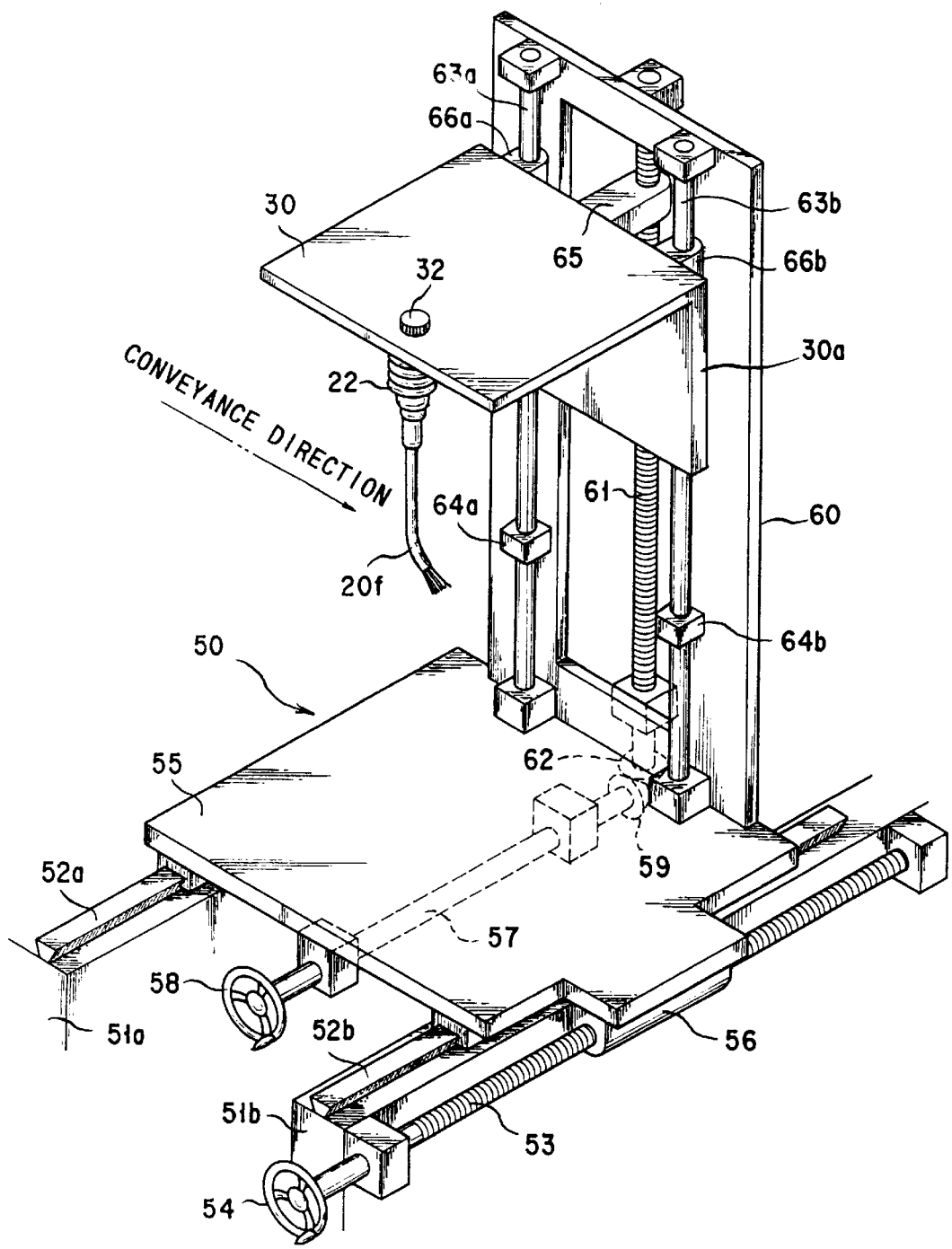
FIG. 11 is a perspective view illustrating one example of a device for adjusting the position of an electrode.

FIG. 11 schematically illustrates the structure of an electrode position adjusting device 50. The electrode position adjusting device 50 is furnished with a pair of laterally disposed supporting bases 51a and 51b, a sliding table 55 slidably mounted on the supporting bases 51a and 51b, and a framework 60 as a supporting member raised erect from the rear edge part of the sliding table 55.

On the upper sides of the supporting bases 51a and 51b, rails 52a and 52b are disposed perpendicularly to the conveying device mentioned above and parallel to the metallic drive roller 41 as centered therearound. On one lateral part of the supporting base 51b, a threaded rod 53 fitted with a handle 54 is rotatably disposed as shown in FIG. 11. On one lateral part of the sliding table 55, a female screw member 56 of ball thread adapted to mesh with the threaded rod 53 mentioned above is fixedly secured. In the central part of the lower side of the sliding table 55, a rotary shaft 57 is rotatably disposed parallel to the rails 52a and 52b. To the leading terminal of the rotary shaft 57, a handle 58 is fitted. To the rear terminal thereof, a bevel gear 59 is fitted. In the central part of the framework 60 raised upright from the rear edge part of the sliding table 55, a threaded rod 61 for vertically moving the elevating plate is disposed in a vertical direction. To the lower terminal of the threaded rod 61, a bevel gear 62 adapted to mesh with the bevel gear 59 of the rotary shaft 57 mentioned above is fitted. On the front sides of the opposite frames of the framework 60, a pair of laterally opposite guide bars 63a and 63b are disposed in the vertical direction as separated by a prescribed distance. Stoppers 64a and 64b are fitted to the predetermined position of the guide bars 63a and 63b. On the rear side of the vertical part 30a of the elevating plate 30 having the electrode (the electrode 20f illustrated in FIG. 9 in the structure illustrated in FIG. 11) fitted thereto through the medium of the porcelain insulator 22, a female screw member 65 is disposed on the center thereof and a pair of guide members 66a and 66b are disposed on either lateral sides thereof, each projected rearward. The female screw member 65 is meshed with the threaded rod 61. The guide bars 63a and 63b mentioned above are inserted through the vertical through holes of the guide members 66a and 66b.

Now, the operation of the electrode position adjusting device 50 will be explained below. First, when the threaded rod 53 is rotated with the handle 54, the sliding table 55 is slid forward and backward on the rails 52a and 52b of the supporting bases 51a and 51b through the medium of the female screw member 56 which is meshed with the threaded rod 53. The sliding table 55 is adapted to assume its vertical position at a predetermined distance below from the driving rollers 41 and 42 of the conveying device 40 illustrated in FIG. 10. After the sliding table 55 has been advanced until the electrode 20f is positioned on the profile conveying path of the conveying device 40, the rotary shaft 57 is rotated with the handle 58. As a result, the threaded rod 61 is rotated through the medium of the bevel gear 62 meshed with the bevel gear 59 at the rear terminal of the rotary shaft 57. In consequence of this rotation of the threaded rod 61, the elevating plate 30 is made to produce a vertical motion through the medium of the female screw member 65 which is meshed with the threaded rod 61. The fall of the elevating plate 30 is stopped when the lower terminal of the vertical part 30a thereof collides against the stopper 64a and 64b and is no longer allowed to continue. Thus, the lowermost position of the electrode 20f is fixed by the stoppers 64a and 64b. In order for the lowermost position to be adjusted when the electrode is replaced, the stoppers 64a and 64b may be fitted vertically adjustably to the guide bars 63a and 63b.

After the position of the electrode 20f on the conveying device 40 has been adjusted as described above, the profile 1 is conveyed on the conveying device 40 as illustrated in FIG. 10 and the pouring pocket 1a thereof is meanwhile subjected to the discharge treatment.

Optionally, the guide bars 63a and 63b formed in a prescribed length may be fixed to the vertical part 30a of the elevating plate 30 and these guide bars may be fitted vertically movably to the framework 60 and adapted such that the fall of the elevating plate 30 may stop when the lower terminals of the guide bars collide against the upper sides of the sliding table 55. For the purpose of allowing automatic adjustment of the positions of the electrode 20f in the forward and the backward direction when the profile 1 being conveyed on the conveying device 40 deviates from the path of conveyance, a profile position sensor may be disposed at a prescribed position of the conveying device 40 and an AC servo motor, for example, may rotate the threaded rod 53 in response to a signal from the sensor so as to set the electrode 20f in the right position.

Figure 12:
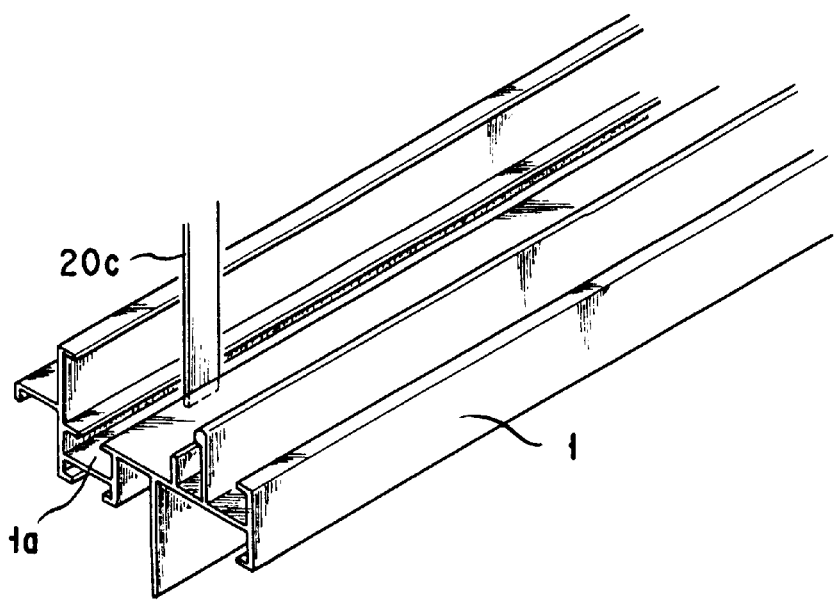
FIG. 12 is a fragmentary perspective view illustrating the state in which an electrode shaped like a plate is inserted into a pouring pocket of a profile.
Figure 13:
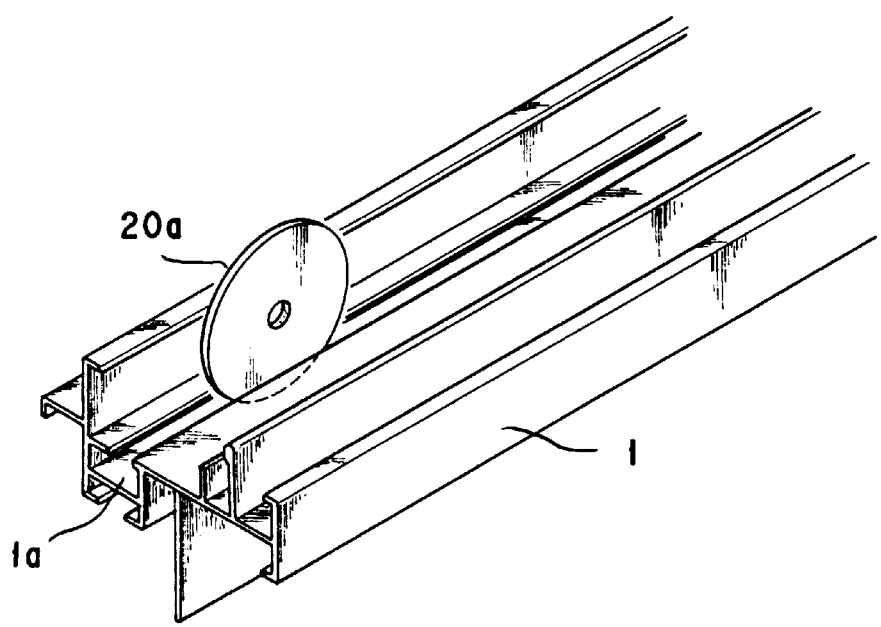
FIG. 13 is a fragmentary perspective view illustrating the state in which an electrode shaped like a disc is inserted into a pouring pocket of a profile.

FIG. 12 and FIG. 13 illustrate the state in which the discharge treatment is performed on the profile 1 in conveyance, respectively with the electrode 20c shaped like a plate as illustrated in FIG. 6 and the electrode 20d shaped like a disc as illustrated in FIG. 7 inserted into the pouring pocket 1a of the profile 1.

Figure 14:
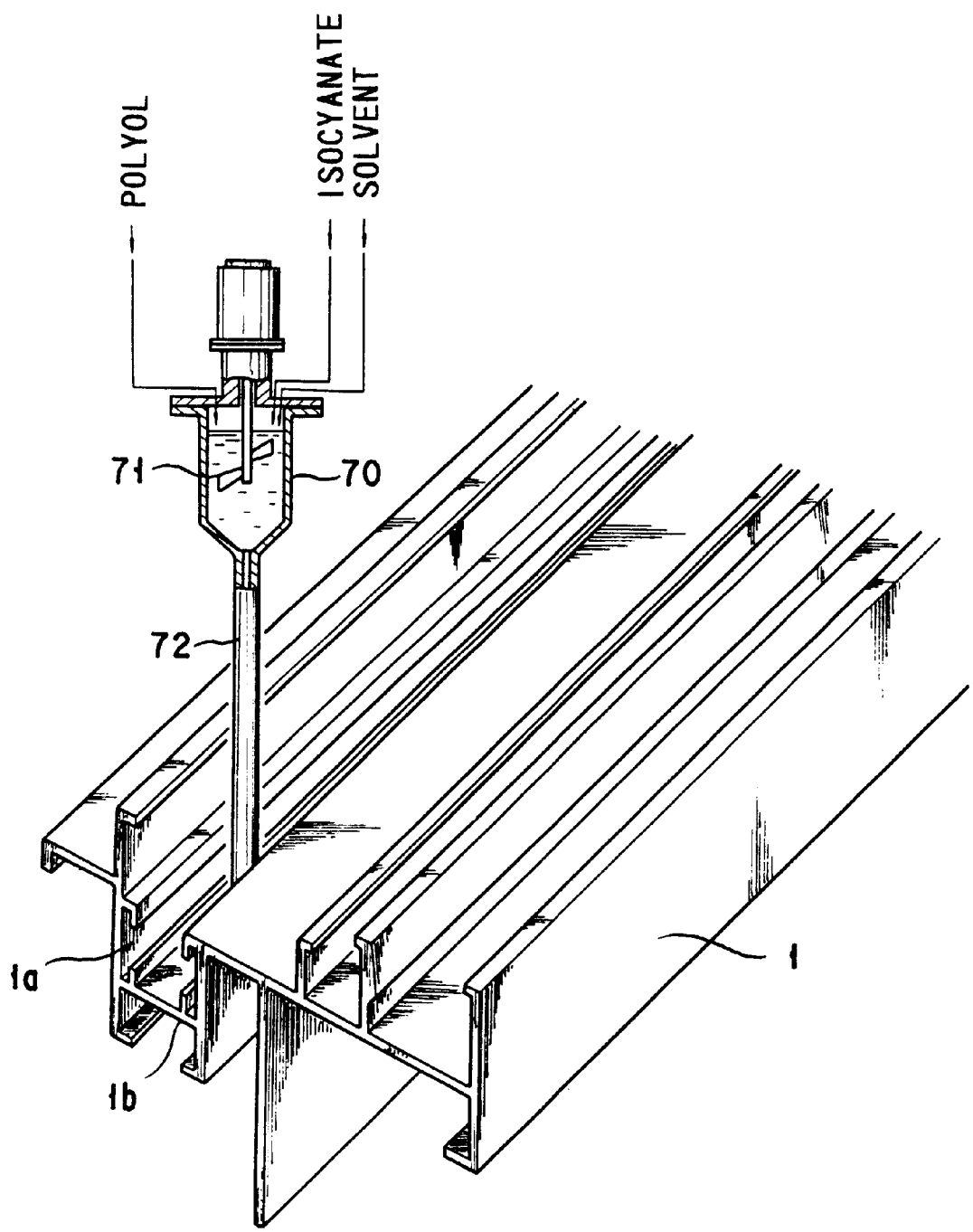
FIG. 14 is a partially sectioned perspective view illustrating the state in which resin is being poured into a pouring pocket of a profile.

The pouring pocket 1a of the profile 1 which has undergone the discharge treatment as described above is then filled with resin as illustrated in FIG. 14.

FIG. 14 illustrates one example of the injection of urethane resin. Isocyanate and polyol which have been pneumatically conveyed in a volumetric ratio of 1:1 from the respective storage tanks (not shown) are fed into a mixing chamber 70 and stirred therein with a mixing rotor 71. The resultant mixture is continuously injected via an injection pipe 72 into the pouring pocket 1a of the profile 1 being conveyed on the conveying device (FIG. 10). After the resin injection operation, the mixing chamber 70 has the interior thereof cleaned with a solvent. Though the conditions for the injection of the resin may be suitably set depending on such factors as the inner volume of the pouring pocket, it is generally advantageous to fix the conveying speed of the profile in the approximate range of 10–30 m/min., the rotating speed of the mixing rotor 71 in the approximate range of 3,000–5,000 revolutions per min., and the amount of the urethane resin to be released in the approximate range of 1–5 liters/min. The position of the injection pipe 72 may be adjusted essentially in the same way as described above in respect to the adjustment of the position of electrode.

After the urethane resin which has been injected is set, part of the bottom portion 1b of the pouring pocket 1a is cut. This practice is the same as in the production of the conventional heat insulating profile, it will be omitted from the description given below.

Then, the heat insulating profile manufactured in accordance with the present invention will be described below with reference to specific data.

The samples manufactured herein were extruded profiles of aluminum electrophoretically coated with three kinds of acrylic coating material, with the pouring pockets thereof subjected to a corona discharge treatment and then filled with urethane resin.

Figure 15:
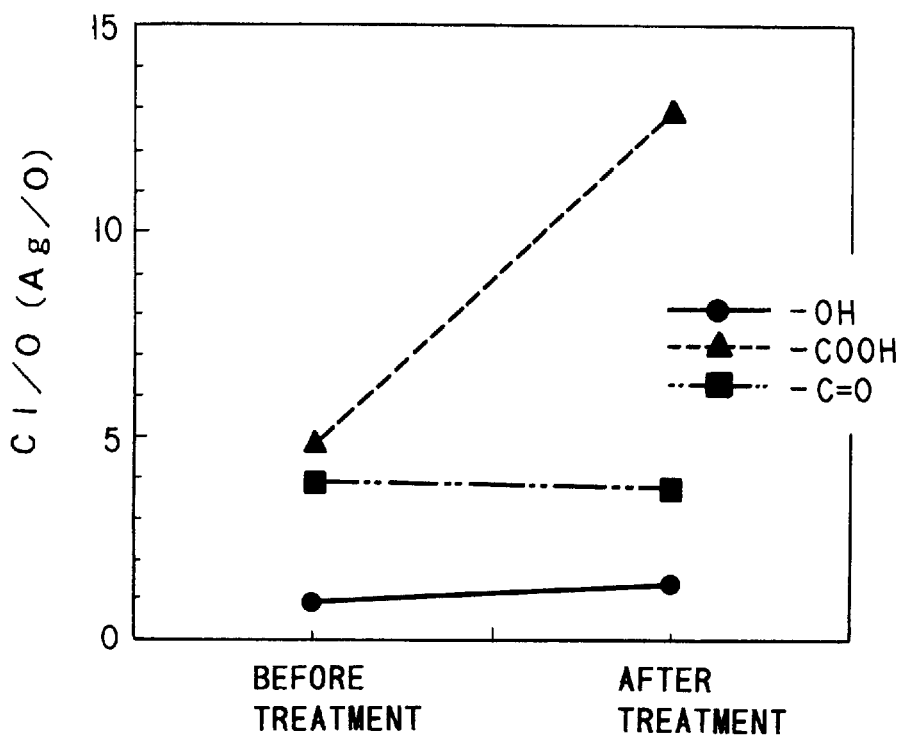
FIGS. 15 through 17 are graphs showing changes of the amount of functional groups in the surface of a coating film before and after various coated profiles have undergone a discharge treatment.
Figure 16:
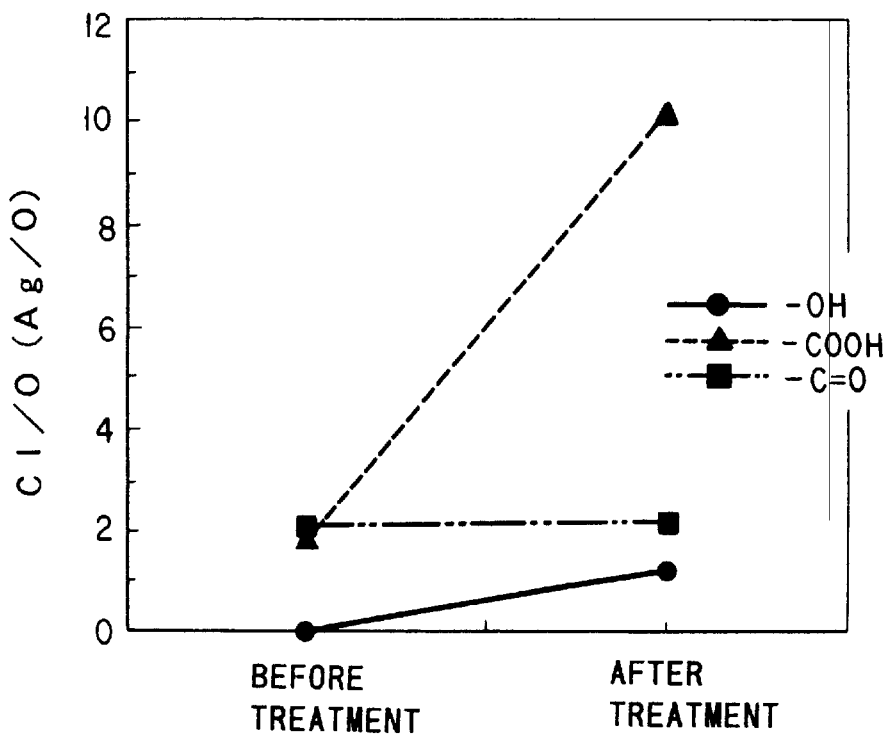
Figure 17:
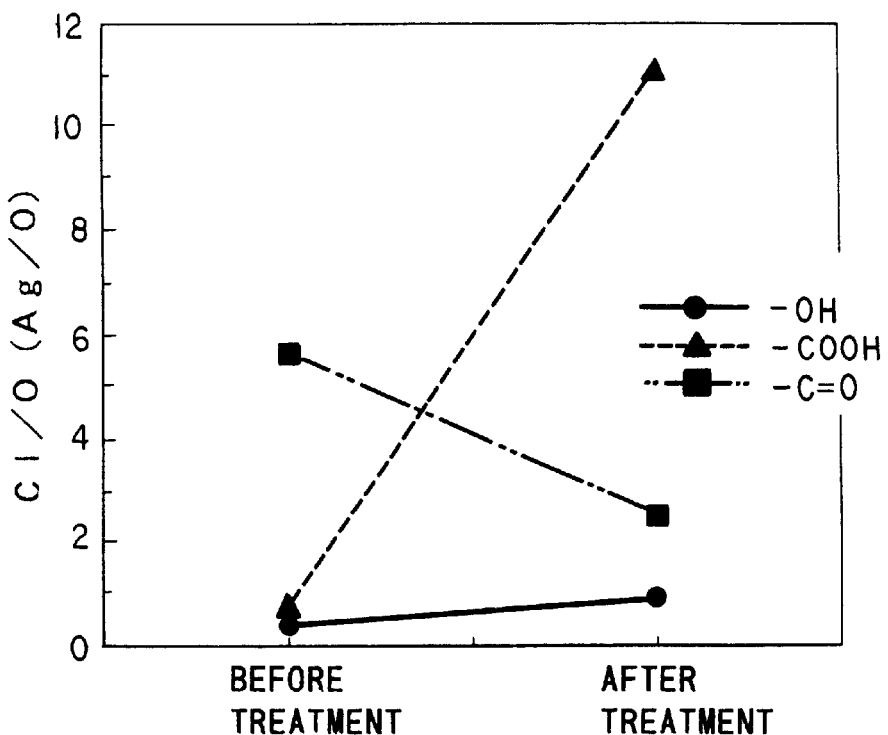

FIG. 15 through FIG. 17 show changes of the amount of functional groups in the surface of a coating film before and after the discharge treatment; FIG. 15 representing the data obtained of a matt coating material, FIG. 16 the data of a white matt coating material, and FIG. 17 the data of a luster coating material. As clearly noted from the analytical results shown in FIG. 15 through FIG. 17 that the discharge treatment resulted in a conspicuous increase of the —COOH group. This marked improvement may be logically explained by a supposition that the discharge treatment resulted in cutting the ester bonds of the acrylic resin. The changes of the amount of functional groups (vertical axis) shown in FIG. 15 through FIG. 17 were obtained by causing a reaction reagent, i.e. silver nitrate with respect to —COOH, p-chlorophenyl isocyanate with respect to —OH, or p-chlorophenyl hydrazine with respect to —C=O, to react with the surface of a given coating film, then analyzing the reagent fixed on the surface of the coating film with ESCA (electron spectroscopy for chemical analysis) to determine the ESCA-sensitive element (silver, chlorine) of the reagent, and displaying the magnitudes of relative intensity of the peaks (ESCA output) in the curves. While the reagent is fixed on the surface of the coating film when a functional group capable of reacting with the reagent is present in the surface of the coating film, the reagent is easily washed out (with a solvent in the absence of such a functional group.

Before and after the discharge treatment, a water drop of 5 μl was poured on the surface of a given coating film and the surface was examined to determine the area (diameter) of the surface covered with the spread film of water. The results are shown in the following table.

TABLE

| Kind of coating film | Spread of wet with water drops (diameter, mm) | |
| --- | --- | --- |
| | No discharge treatment made | Discharge treatment made |
| Matt coating material | 2.8 | 3.7–3.8 |
| Luster coating material | 2.9 | 3.9 |
| White matt coating material | 2.7–2.8 | 3.7–3.8 |

It is clearly noted from the table given above that on all the coating films, the discharge treatment widened the area of spread of water, added to the wettability (hydrophilicity) of the coating film, or exalted the surface tension.

Then, from the manufactured heat insulating profiles, test pieces (50×43 mm=2150 mm$^2$, urethane resin thickness about 6 mm, layer composition: electrophoretically coated aluminum sheet/urethane resin/electrophoretically coated aluminum sheet) were cut and subjected to a tensile test. The test was performed after the urethane resin poured in the profile was left curing for 24 hours. In the test, the tension was applied perpendicularly to the surface of the test piece at a rate of 1 mm/min. As a result, the maximum tensile strength, 311.3 kgf (matt coating material), 363.7 kgf (luster coating material), and 449.2 kgf (white matt coating material) (invariably the average value of three measurements), was obtained.

In a separate test for shear strength which was carried out by keeping one of the electrophoretically coated aluminum sheet fixed and applying a load to the other electrophoretically coated aluminum sheet under the condition of shear rate of 1 mm/min., the maximum shear strength, 305.7 kgf (matt coating material), 594.5 kgf (luster coating material), and 477.8 kgf (white matt coating material) (invariably the average of three measurements), was obtained.

It is noted from the test results mentioned above that the discharge treatment fairly added to the adhesive strength of the profile and the resin.

Then, heat insulating profiles designed for left vertical frame, right vertical frame, upper frame, and lower frame were manufactured in the same manner as described above, with or without a discharge treatment. They were retained at 60° C. for 16 hours, at 23° C. for one hour, then at −20° C. for six hours, and thereafter at 23° C. for one hour, and subsequently they were returned to the first retention at 60° C. for 16 hours. This cycle of heat treatment was repeated by way of a cooling-heating repeating test. The results are shown in FIG. 18.

Figure 18:
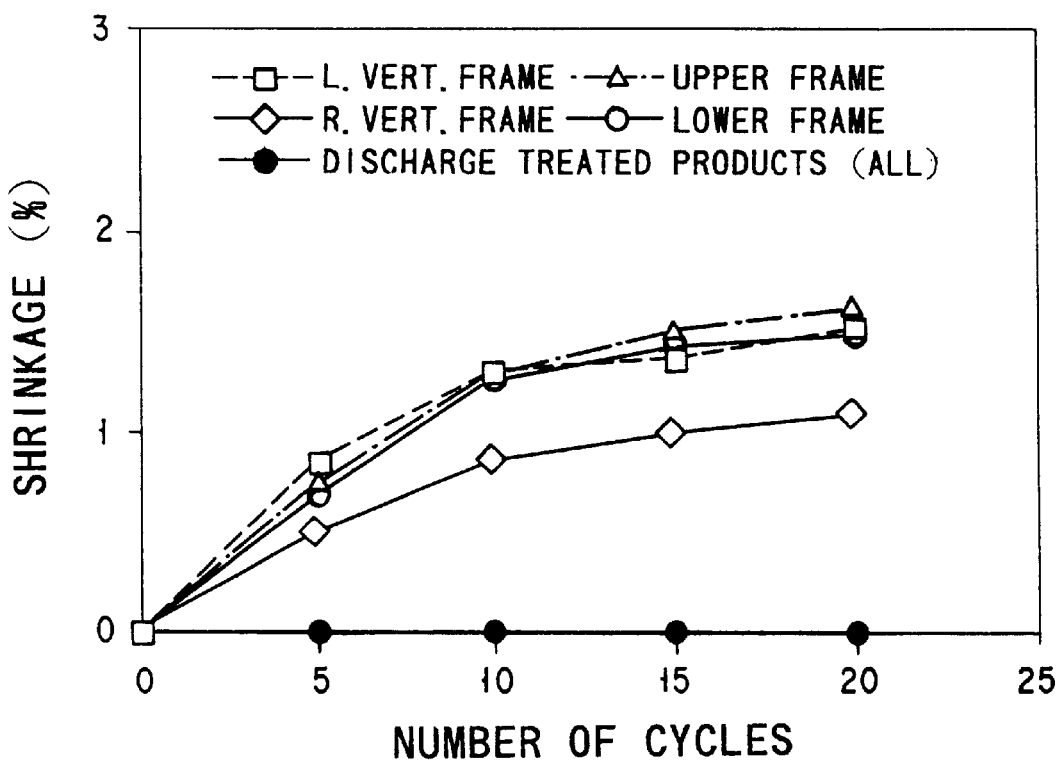
FIG. 18 is a graph showing the change of the ratio of shrinkage of urethane resin found by a test of repeated cycles of cooling and heating performed on various kinds of heat insulating profiles.

It is clearly noted from FIG. 18 that the discharge treatment prevented the packed urethane resin from shrinking after the cooling-heating repeating test mentioned above. The profiles for the left vertical frame, right vertical frame, upper frame, and lower frame which had undergone the discharge treatment registered identical results. FIG. 18, therefore, shows one representative data.

While certain specific embodiments have been disclosed herein, the invention may be embodied in other specific forms without departing from the spirit or essential characteristics thereof. The described embodiments are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A resin-composite heat insulating aluminum profile, comprising:

an aluminum profile comprising a pair of lateral sheet members having a coating film applied thereon, said coating film being formed from a coating material capable of forming a functional group, which reacts with isocyanate, in consequence of a discharge treatment, at least part of the coated surface of said profile being discharge treated and including at least a pair of discharge treated, opposed recesses respectively formed in opposed surfaces of said lateral sheet members, and a joining member of a urethane resin joined to the discharge treated recesses of said aluminum profile, said urethane resin being substantially formed of isocyanate and polyol.

* * * * *